United States Patent [19]

Higashionji et al.

[11] Patent Number: 5,303,108
[45] Date of Patent: Apr. 12, 1994

[54] MAGNETIC HEAD DEVICE

[75] Inventors: Masaru Higashionji, Katano; Hideaki Mukae, Sanda; Akio Murata, Ibaraki; Takaaki Maegawa, Neyagawa, all of Japan

[73] Assignee: Matsushita Electric Industrial Co., Ltd., Tokyo, Japan

[21] Appl. No.: 870,427

[22] Filed: Apr. 17, 1992

[30] Foreign Application Priority Data

Apr. 17, 1991 [JP] Japan .................. 3-085048

[51] Int. Cl.$^5$ .................. G11B 21/16; G11B 21/24
[52] U.S. Cl. .................. 360/137; 360/107
[58] Field of Search .............. 360/75, 76, 77.13, 77.16, 360/109, 110, 104, 107, 137

[56] References Cited

U.S. PATENT DOCUMENTS

| | | | |
|---|---|---|---|
| 4,203,140 | 5/1980 | Watanabe | 360/77.16 |
| 4,814,908 | 3/1989 | Schmitz | 360/109 |
| 4,882,635 | 11/1989 | Sanai | 360/77.16 |
| 5,065,267 | 11/1991 | Yohda | 360/109 |
| 5,103,361 | 4/1992 | Nagatsuka et al. | 360/77.16 |

FOREIGN PATENT DOCUMENTS

| | | |
|---|---|---|
| 61-189463 | 11/1986 | Japan . |
| 62-93028 | 4/1987 | Japan . |
| 62-134118 | 6/1987 | Japan . |
| 1-227279 | 9/1989 | Japan . |
| 4-310613 | 11/1992 | Japan . |

OTHER PUBLICATIONS

Rikohgaku-sha, "Welding Engineering", First Edition, May 11, 1989, with summary and translation of pp. 80-84.

Primary Examiner—Louis J. Casaregola
Attorney, Agent, or Firm—Wenderoth, Lind & Ponack

[57] ABSTRACT

A magnetic head device includes a rotary cylinder and a magnetic head having one end fixed to an inner portion of one surface of the rotary cylinder such that the magnetic head extends from the inner portion toward the outer circumference of the rotary cylinder in alignment with a radius thereof. The head tip is provided on another end of magnetic head. A laser beam is impinged on the base plate at a portion within a range from 2 mm to $(5 \times T\frac{1}{2})$mm from the outer edge of head tip where T is a thickness of the bass plate. The portion on which the beam impinged is heated and melts causing the base plate to incline in a vertical direction which is parallel to an axis the rotary cylinder. Thus, the head tip is positioned at a required horizontal level which is perpendicular to the axis of the rotary cylinder.

6 Claims, 3 Drawing Sheets

MAGNETIC HEAD DEVICE

BACKGROUND OF THE INVENTION

1. Field of the Invention

The present invention relates to a magnetic head device for reading, recording, or erasing signals on a magnetic tape and, more particularly, to a magnetic head device for use in a helical scanning type videotape recorder.

2. Description of the Prior Art

Positioning of a magnetic head is an important factor which determines the quality of the information written on a magnetic tape. Especially, when a plurality of magnetic heads are used for recording, each of the magnetic heads should be located at a determined position so as not to adversely influence each other.

For example, in an video cassette recorder (VCR) of a video home system (VHS), each one of two magnetic heads is located in a symmetric position with respect to the axis of the rotary cylinder and on the same plane perpendicular to the axis. The videotape is wound around a half surface of the rotary cylinder with an inclination angle of approximately 6° with respect to the diametrical circle thereof. Thus, the direction in which the videotape runs is changed along the rotary cylinder such that the wound videotape exhibits a U-shape when viewed from the top of the rotary cylinder. As each of magnetic heads runs over the surface of videotape alternatively, the recorded magnetism pattern is formed on the videotape surface subsequently. The writing pitch between each track in which the magnetism pattern is recorded is a predetermined 60 μm or 20 μm.

It is to be noted that both the magnetic heads should be located on the same plane perpendicular to the axis of the rotary cylinder. If any one of the magnetic heads deviates from the plane by some amount, the preceding magnetism pattern is overwritten by the following magnetism pattern, or a large gap is formed between tracks. In both cases, the recorded magnetism pattern is unevenly formed on the videotape, resulting in a degradation of the signals reproduced from the recorded magnetism pattern.

There two methods are available in the field of this art. A first method involves elastic deformation in the magnetic heads are moved toward an aimed position elastically by pressing a portion of the magnetic head with the means of a screw. The second method involves, as disclosed in U.S. Pat. Ser. No. 07/798,601 filed on Nov. 26, 1991, melting deformation in which a portion of the magnetic head is melted by impinging a laser beam thereon to deform the magnetic head permanently toward the desired position.

In the first method, i.e. elastic deformation with a screw, since the magnetic head is elastically deformed and is temporarily positioned, the magnetic head experiences movement of some μm and can return to the original position due to loosening of the screw, external vibrations, and other causes. Thus, this method can not be applied to the positioning of the magnetic head in which the magnetic patterns are to be recorded, at a writing pitch of 20 μm or smaller.

In the second method, i.e. melting deformation with a laser beam, the magnetic head is deformed permanently and is self-positioned. Thus, this method enables the positioning of the magnetic head with a high accuracy and fine adjustment, and is a very effective means in the field of high density recording. However, it is very difficult to stably control the position of the magnetic head applied with the melting deformation.

Furthermore, since the plate applied with the melting deformation deforms in proportion to the amount of applied heat and in inverse proportion to the plate thickness generally, a longer distance between the melting deformation and the magnetic head gap is required to adjust the position of the magnetic head within a wide range. However, such a magnetic head is supported at one end like a cantilever, so that the head tip at the free end of the magnetic head spaced far from the supported end is easily subjected vibrations caused by the rotating rotary cylinder to prevent the formation of a magnetism pattern on the correct tracks.

Furthermore, if the magnetic head is bent with a larger angle at a portion near the head chip, the head unevenly contacts with the videotape, resulting in a reduction of the reproduced signal output therefrom. Since the portion on which the laser beam is impinged is not specified, the melting deformation methods using the laser beam can not be applied in the mass production of the magnetic heads.

SUMMARY OF THE INVENTION

The present invention has been developed with a view to substantially solving the above described disadvantages and has for its essential object to provide an improved magnetic head device.

In order to achieve the aforementioned objective, a magnetic head device for writing and reading a magnetism pattern on and from a recording medium wound around a rotary cylinder means having an axis Y comprises a head means for writing and reading the magnetism pattern on and from the recording medium; an elongating plate means having one end fixed to one surface of the rotary cylinder means so as to extend toward an outer circumference of the rotary cylinder means and another end provided with the head means. The elongating plate means has a thickness T and a length A which is a distance between the fixed end and an outer edge of the head and the thickness T and the length A have a relationship, $A \leq 5 \times T^{\frac{1}{2}}$. A laser beam impinging means for impinging a laser beam on the elongating plate means. The laser beam is impinged at a portion at least 2 mm far from the outer edge of head means and the laser impinged portion melts and inclines the head means so as to be positioned on a desired level which is parallel to said axis Y.

BRIEF DESCRIPTION OF THE DRAWINGS

These and other objects and features of the present invention will become clear from the following description taken in conjunction with the preferred embodiments thereof with reference to the accompanying drawings throughout in which like parts are designated by like reference numerals, and in which.

DETAILED DESCRIPTION OF THE PREFERRED EMBODIMENTS

Figure 1:
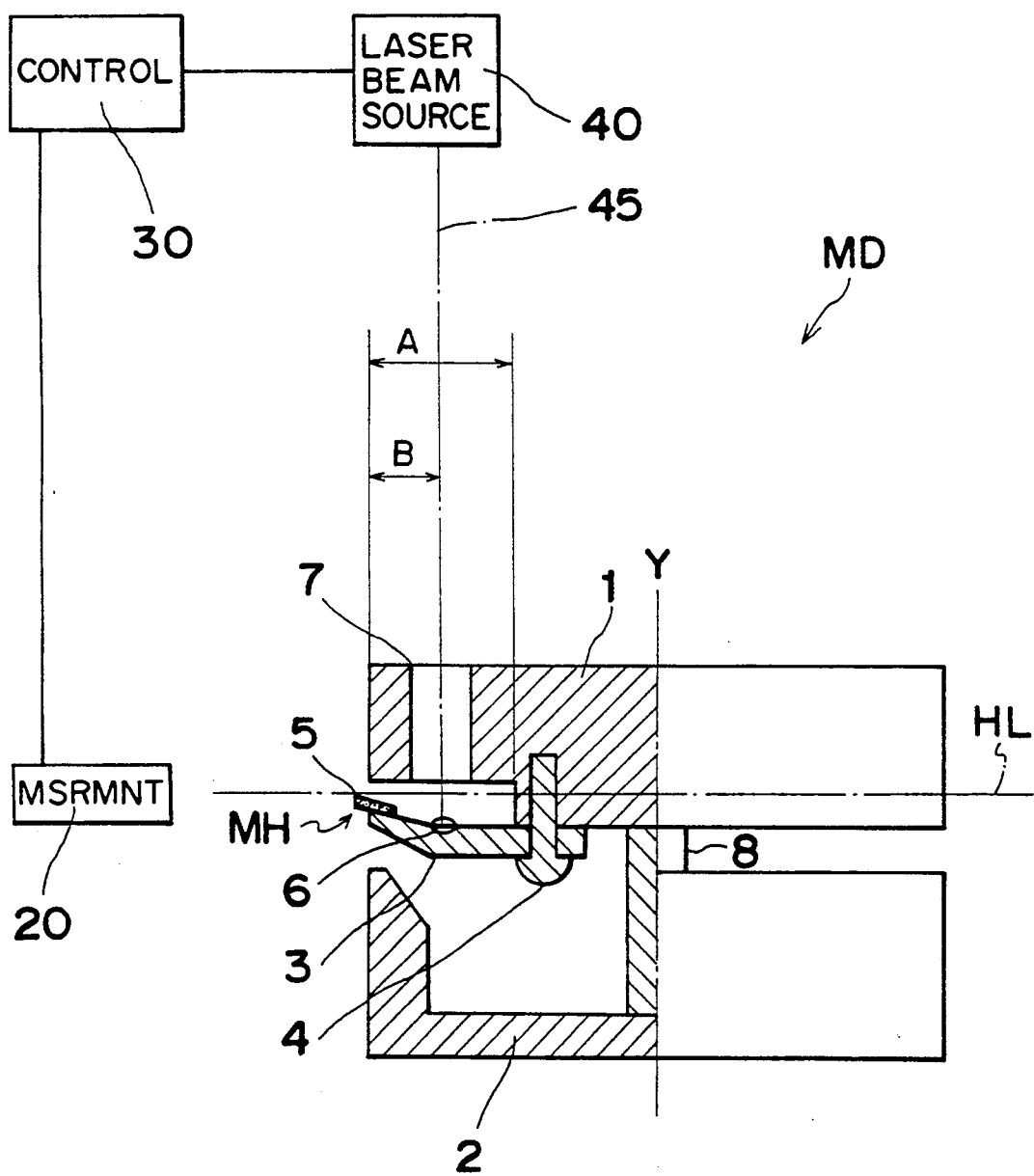
FIG. 1 is a partially removed schematic view of a magnetic head device according to the present invention.

Referring to FIG. 1, a magnetic head device MD of a preferred embodiment is shown. The magnetic head device MD includes a lower stationary cylinder 2 having an axis Y, a shaft 8 provided in alignment with the axis Y, an upper rotary cylinder 1 which has a through hole 7 extending from one surface to the other in parallel to the axis Y and is rotatably connected with the shaft 8 in alignment with the axis Y so as to be apart from the cylinder 2, and a magnetic head MH which has a base plate 3 and a head tip 5 for reading/writing the magnetism pattern provided on the one end of the base plate 3. The magnetic head MH is installed on the lower surface of the upper rotary cylinder 1 by a screw 4 at the end far from the head tip 5 such that the base plate 3 is located under the through hole 7 and the top of head tip 5 coincides with the outer circumference of the upper cylinder 1 or extrudes therefrom by approximately 40 $\mu$m.

Each head tip 5 installed on the upper cylinder 1 should be positioned on a horizontal level of a specific plane HL perpendicular to the axis Y. To adjust the position of the head tip 5, the magnetic head device MD further includes a laser beam source 40 for emitting a laser beam 45, a control unit 30 for controlling the laser beam source 40, and a head height measurement unit 20 which measures the horizontal position of head tip 5 with respect to the specific plane HL. The laser beam source 40 emits the laser beam 45 through the hole 7 toward the base plate 3. The emitted laser beam 45 impinges the plate 3 on a laser impingement portion 6 thereof indicated by an oval in FIG. 1. Due to the heat quantity provided by the laser beam 40, the laser impingement portion 6 melts. Thus, the base plate 3 deforms and changes its horizontal position with respect to the laser impingement portion 6, causing an angular position of the plate 3 to vary with respect to the upper cylinder 1. As a result, the head tip 5 on the base plate 3 moves vertically and changes the horizontal height measured from the specific level HL. The control unit 30 controls the head height measurement unit 20 to measure the horizontal level of the tip 5 precisely, calculates the difference from the specific level HL, determines the energy of the laser beam 45 and the position on the base plate 4 to be impinged by the laser beam 45, and repeats the above described processes until the head tip 5 is located on the required position, thus enabling the precise adjustment of the horizontal position of the tip 5. It is to be noted that the laser beam used for this purpose, for example, is a pulse wave laser having an energy of one joule/pulse or ten joule/pulse and is impinged for one msec. or 10 msec.

Figure 4:
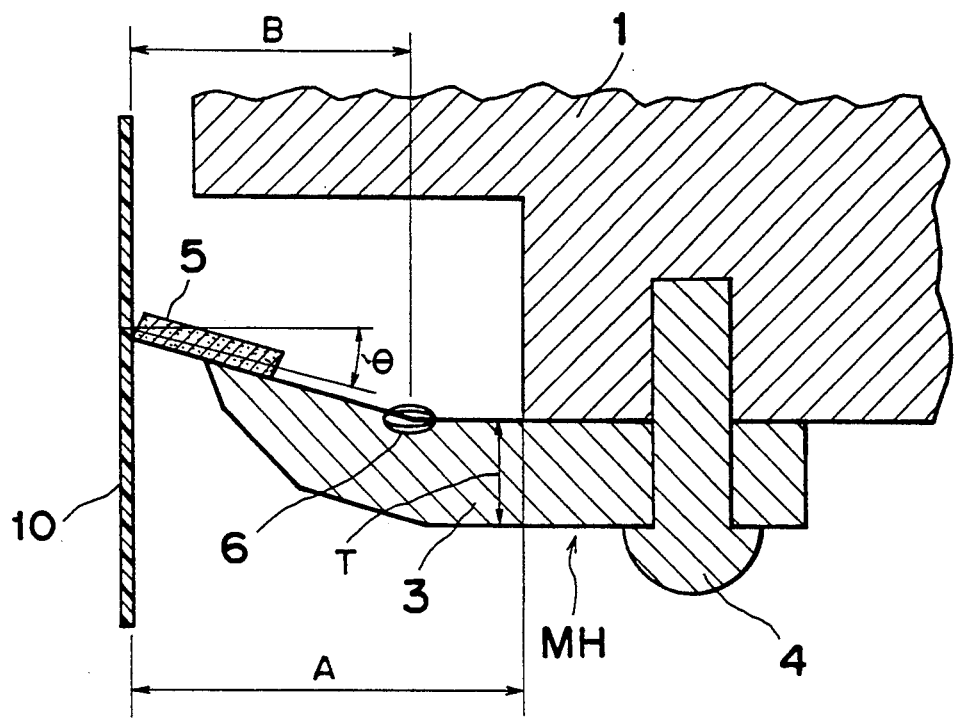
FIG. 4 is a schematic sectional view showing the magnetic head device shown in FIG. 1.

Referring to FIG. 4, an enlarged view of the base plate 3 is shown. The base plate 3 has a free end portion which having a length is defined by lengths A and B and a fixed end portion which is fixed to the cylinder 1 by the screw 4. The lengths A and B are distances between the outer edge of the tip 5 and the fixed end of the plate 3 and between the outer edge of tip 5 and the impingement portion 6, respectively. In actual practice, for example, ten pulses of the laser beam 40 having a diameter of approximately 100 $\mu$m is impinged on the portion 6, but no more pulses of laser impingement is effective to further change the horizontal position of head tip 5. Since it is necessary to impinge the laser beam 40 as far from the free end as possible to move the tip 5 further in the vertical direction, the through hole 7 of a greater diameter and the base plate 3 having a longer free portion are employed.

Figure 2:
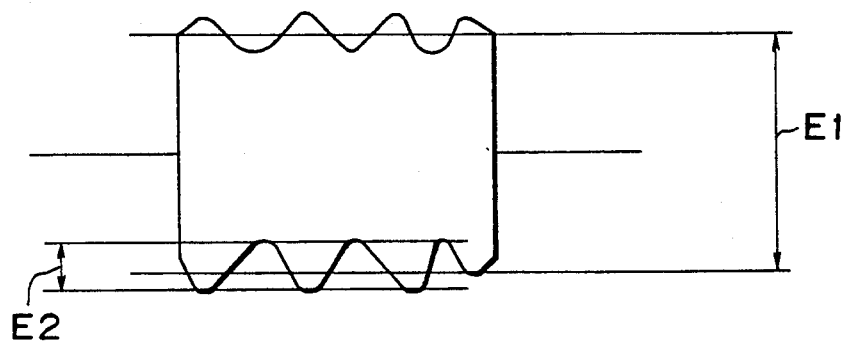
FIG. 2 is a graph showing waveforms of the envelope of a reproduced signal output from the magnetic head device shown in FIG. 1.

The magnetic head device according to the present invention was tested on two cases in which the lengths A and B are respectively set so as to evaluate the relationship between the lengths A and B. Results of those tests on are shown in the respective graphs of FIGS. 3 and 5. To evaluate the performances of the magnetic head device according to the present invention, the configuration of the respective envelopes of the writing signal level and the reproduced signal level shown in FIG. 2 is employed. In FIG. 2, the levels E1 and E2 represent the maximum amplitude of the reproduced signal output through the head MH and the variable amplitude, respectively.

Figure 3:
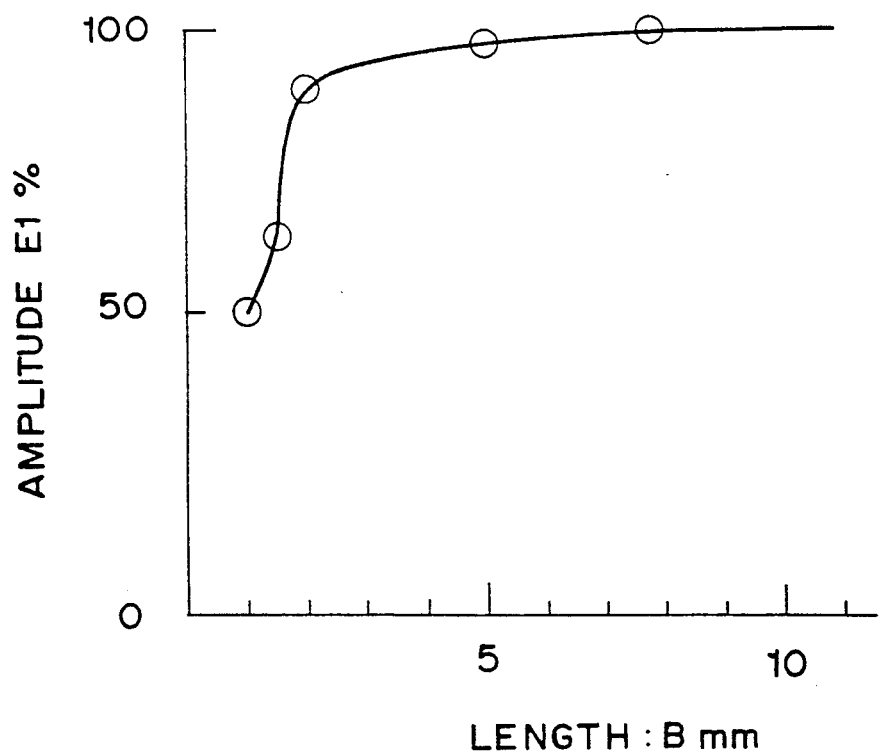
FIG. 3 is a graph showing a relationship between the reproduced signal and the distance between the head tip end and the portion on which the laser beam is impinged of the magnetic head device shown in FIG. 1.

Referring to FIG. 3, a result of a test in which the length A is constant at 8 mm and the length B is variable is shown. It clearly shows that when the adjustment amount required for positioning of the head tip 5 is 20 $\mu$m, the maximum amplitude E1 rapidly decreases within the range in which the length B is less than 2 mm regardless of the plate thickness T of the base plate 3. This is caused as follows with reference to FIG. 4. When the base plate 3 deforms at the location within 2 mm far from the outer edge of the tip 9, an angle $\theta$ defined by a horizontal line perpendicular to the axis Y and the tip 5 becomes large, causing the tip 5 to slant against the videotape 10. Thus, the tip 5 can not be in close contact with the videotape 10, and spacing loss between the tip 5 and the videotape 10 occurs regardless of the plate thickness T of the base plate 3.

Figure 5:
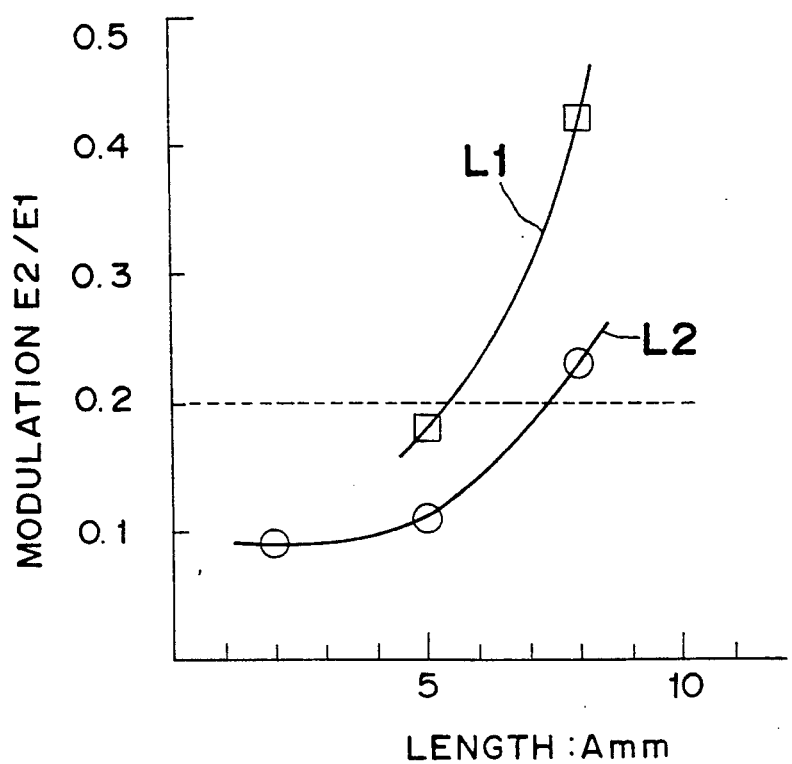
FIG. 5 is a graph showing a relationship between the reproduced signal and the head base of the magnetic head device shown in FIG. 1.

Referring to FIG. 5, results of another test in which the length A is variable and the length B is constant at 2.5 mm and subject to externals vibrations is shown This test results include the tests executed with respect to the base plate 3 in which the plate thickness T is 2 mm and 1 mm. The lines L1 and L2 respectively represent the length-modulation relationship when T is 1 mm and T is 2 mm. It clearly shows that when the upper cylinder 1 rotates at a speed of 1800 rpm, the magnetic head MH comprised of a longer base plate 3 vibrates by itself, causing this self-vibration to influence to the reproduced signal output. Thus, the reproduced signal output by the magnetic head device MD is modulated, resulting in a degradation of the reproduction quality. When 0.2 is employed as an allowable limit of E2/E1, 5 mm is the largest value allowable for the length A when T is 1 mm, and 7 mm is the largest value allowable for the length A when T is 2 mm, as indicated by the lines L1 and L2, respectively. In consideration of a relationship in a cantilever in which the coherent frequency fr is in proportion to T and in reverse proportion A squared ($fr \alpha T/A^2$), the following experimental equation can be applied for the determination of an allowable limit dimension of A.

$$\text{Allowable limit } A = L_{max} = 5 \times T^{\frac{1}{2}} (\text{unit: mm}) \qquad (1)$$

As is apparent from the above, it is necessary to limit the configuration of the base plate 3 when positioning the magnetic head MH using an impinging laser beam 40 on the base plate 3. The portion on which the laser beam can be impinged is to be within a range extending from a location 2 mm or more from the outer end of the tip 5 to a location $(5 \times T^{\frac{1}{2}})$mm from the outer end of the tip 5. T is a thickness of the base plate 3. The magnetic head device in according to the present invention provides for an improved performance in the reading/writing characteristics when compared the conventional magnetic head device.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic head device for writing and reading a magnetism pattern onto and from a recording medium wound around a rotary cylinder, said device comprising:
    a magnetic head for writing and reading the magnetism pattern onto and from the recording medium; and
    an elongate plate having one end fixed to one surface of the rotary cylinder so as to extend from said one end toward an outer circumference of the rotary cylinder and having another end with said magnetic head fixed thereto, said elongate plate having a thickness T and a length A, said length A defined by a distance between said fixed end and an outer edge of said magnetic head, said thickness T and said length A having a relationship $A \leq 5 \times T^{\frac{1}{2}}$, said elongate plate having a plastically deformed bent portion located at a position which is at least 2 mm from said outer edge of said magnetic head so that said magnetic head is aligned at a predetermined level.

2. A magnetic head device as claimed in claim 1, wherein said thickness T is 2 mm and said length A is 7 mm.

3. A magnetic head device as claimed in claim 1, wherein said bent portion is thermally formed by application of a laser beam.

4. A magnetic head device as claimed in claim 1, wherein said thickness T is 1 mm and said length A is 5 mm.

5. An apparatus comprising:
    a magnetic head for writing and reading a magnetism pattern onto and from a recording medium wound around a rotary cylinder;
    an elongate plate having one end fixed to one surface of the rotary cylinder so as to extend from said one end toward an outer circumference of the rotary cylinder and having another end with said magnetic head fixed thereto, said elongate plate having a thickness T and a length A, said length A defined by a distance between said fixed end and an outer edge of said magnetic head, said thickness T and said length A having a relationship $A \leq 5 \times T^{\frac{1}{2}}$; and
    a laser beam impinging means for impinging a laser beam on said elongate plate at a position which is at least 2 mm from said outer edge of said magnetic head, said laser beam having sufficient energy to thermoplastically bend said elongate plate at said position to align said magnetic head at a predetermined level.

6. An apparatus as claimed in claim 5, wherein said laser beam impinging means comprises:
    a laser beam emitting means for emitting said laser beam toward said elongate plate;
    a measurement means for measuring a level of said magnetic head which respect to a plane perpendicular to a rotary axis of the rotary cylinder; and
    a control means for controlling said laser beam impinging means based on said level measured by said measurement means, wherein said control means continues laser beam impingement until the level measured by said measurement means reaches the predetermined level.

* * * * *

UNITED STATES PATENT AND TRADEMARK OFFICE
CERTIFICATE OF CORRECTION

PATENT NO. : 5,303,108
DATED : April 12, 1994
INVENTOR(S) : Masaru HIGASHIONJI et al.

It is certified that error appears in the above-identified patent and that said Letters Patent is hereby corrected as shown below:

On the cover page, item [73], change "Tokyo" to --Osaka--.

Signed and Sealed this

Twenty-sixth Day of September, 1995

Attest:

BRUCE LEHMAN

Attesting Officer  Commissioner of Patents and Trademarks